US009550888B2

(12) United States Patent
Lodyga et al.

(10) Patent No.: US 9,550,888 B2
(45) Date of Patent: *Jan. 24, 2017

(54) LOW VISCOSITY FILLER COMPOSITION OF BORON NITRIDE PARTICLES OF SPHERICAL GEOMETRY AND PROCESS

(75) Inventors: David Lodyga, Medina, CA (US); Joseph W. Tereshko, Broadview Heights, OH (US); Ajit Sane, Medina, OH (US); Thomas Fox, Euclid, OH (US)

(73) Assignee: Momentive Performance Materials Inc., Waterford, NY (US)

( * ) Notice: Subject to any disclaimer, the term of this patent is extended or adjusted under 35 U.S.C. 154(b) by 2971 days.

This patent is subject to a terminal disclaimer.

(21) Appl. No.: 10/652,283

(22) Filed: Aug. 29, 2003

(65) Prior Publication Data

US 2004/0077764 A1    Apr. 22, 2004

Related U.S. Application Data

(63) Continuation of application No. 09/754,154, filed on Jan. 3, 2001, now Pat. No. 6,713,088, and a continuation-in-part of application No. 09/386,883, filed on Aug. 31, 1999, now abandoned.

(51) Int. Cl.
C08K 9/08 (2006.01)
(52) U.S. Cl.
CPC ..................... C08K 9/08 (2013.01)
(58) Field of Classification Search
USPC ........... 424/489, 490, 600, 657, 718; 514/64
See application file for complete search history.

(56) References Cited

U.S. PATENT DOCUMENTS

| | | | |
|---|---|---|---|
| 3,499,859 A | | 3/1970 | Matherly |
| 3,617,358 A | | 11/1971 | Dittrich |
| 4,202,523 A | * | 5/1980 | Radtke .......................... 249/115 |
| 4,460,739 A | | 7/1984 | Ashby |
| 4,623,738 A | | 11/1986 | Sugerman et al. |
| 4,634,785 A | | 1/1987 | Sugerman et al. |
| 4,985,184 A | | 1/1991 | Takahashi et al. |
| 5,001,091 A | | 3/1991 | Pujari et al. |
| 5,008,307 A | | 4/1991 | Inomata |
| 5,049,450 A | * | 9/1991 | Dorfman et al. ............. 428/570 |
| 5,106,502 A | * | 4/1992 | Goldsmith .................... 210/490 |
| 5,139,693 A | | 8/1992 | Wilms et al. |
| 5,182,239 A | | 1/1993 | Hirokawa et al. |
| 5,196,471 A | | 3/1993 | Rangaswamy et al. |
| 5,380,782 A | | 1/1995 | Bogan, Jr. |
| 5,384,352 A | | 1/1995 | Andres et al. |
| 5,421,864 A | | 6/1995 | Chiba et al. |
| 5,427,698 A | * | 6/1995 | Hirokawa et al. ............ 508/106 |
| 5,457,075 A | | 10/1995 | Fukushima et al. |
| 5,506,055 A | * | 4/1996 | Dorfman et al. ............. 428/407 |
| 5,665,511 A | | 9/1997 | Imai et al. |
| 5,681,883 A | | 10/1997 | Hill et al. |
| 5,818,564 A | | 10/1998 | Gray et al. |
| 5,859,105 A | | 1/1999 | Nguyen |
| 5,898,009 A | | 4/1999 | Shaffer et al. |
| 6,022,395 A | * | 2/2000 | Eckert et al. .................. 75/365 |
| 6,048,511 A | | 4/2000 | Shaffer et al. |
| 6,048,919 A | | 4/2000 | McCullough |
| 6,090,484 A | | 7/2000 | Bergerson |
| 6,160,042 A | | 12/2000 | Ishida |
| 6,162,849 A | | 12/2000 | Zhuo et al. |
| 6,246,459 B1 | | 6/2001 | Simhambhatla et al. |
| 6,280,584 B1 | | 8/2001 | Kumar et al. |
| 6,391,442 B1 | | 5/2002 | Duvall et al. |
| 6,508,908 B2 | | 1/2003 | Gudmundson et al. |
| 6,542,371 B1 | | 4/2003 | Webb |
| 6,645,612 B2 | | 11/2003 | Pujari et al. |
| 6,652,822 B2 | | 11/2003 | Phillips et al. |
| 6,677,068 B2 | | 1/2004 | Itoh et al. |
| 6,713,088 B2 | * | 3/2004 | Lodyga et al. ............... 424/489 |
| 6,761,928 B2 | | 7/2004 | Hill et al. |
| 6,797,758 B2 | | 9/2004 | Misra et al. |
| 6,831,031 B2 | | 12/2004 | Ishihara |
| 6,835,453 B2 | | 12/2004 | Greenwood et al. |
| 6,913,827 B2 | | 7/2005 | George et al. |
| 2002/0127406 A1 | | 9/2002 | Sachdev et al. |
| 2003/0073769 A1 | * | 4/2003 | Pujari et al. .................. 524/404 |
| 2003/0152764 A1 | | 8/2003 | Bunyan et al. |
| 2003/0195124 A1 | | 10/2003 | Yamada et al. |
| 2003/0203188 A1 | | 10/2003 | H. |
| 2003/0207064 A1 | | 11/2003 | Bunyan et al. |

(Continued)

FOREIGN PATENT DOCUMENTS

EP    0198374 A      10/1986
EP    0 322 165      6/1989

(Continued)

OTHER PUBLICATIONS

Gennaro, Alfonso R., Remington's Pharmaceutical Sciences, 1985, Mack Publishing Company, pp. 1317-1318.*
Pay Yih and Deborah D.L. Chung; "Power Metallurgy Fabrication of Metal Matrix Composites Using Coated Fillers"; pp. 335-340; The International Journal of Powder Metallurgy, 1995.
Office Action for U.S. Appl. No. 11/327,770, dated Jan. 12, 2007.
Office Action for U.S. Appl. No. 11/327,770, dated Aug. 10, 2007.
Office Action for U.S. Appl. No. 11/327,770 dated Jan. 14, 2008.
Office Action for U.S. Appl. No. 11/327,770 dated Jul. 9, 2008.
Office Action for U.S. Appl. No. 11/327,770, dated Feb. 23, 2009.
Office Action for U.S. Appl. No. 11/248,095, dated Jan. 19, 2007.
Office Action for U.S. Appl. No. 11/248,095, dated Aug. 3, 2007.
Office Action for U.S. Appl. No. 11/248,095, dated Feb. 20, 2008.
Office Action for U.S. Appl. No. 11/248,095, dated Jul. 11, 2008.
Office Action for U.S. Appl. No. 11/554,005, dated Jun. 27, 2008.
MacMillan, Encyclopedia of Physics, J.S. Rigden, Ed., Simon & Schuster MacMilan; New York, 1986, vol. 4, p. 1677.
Salvatore J. Monte, Neoalkoxy Titanate and Zirconate Coupling Agent Additives in Thermoplastics, Polymers & Polymer Composites, vol. 10, No. 2, 2002.

(Continued)

Primary Examiner — Abigail Fisher
(74) Attorney, Agent, or Firm — Joseph Waters; McDonald Hopkins LLC

(57) ABSTRACT

A low viscosity filler boron nitride agglomerate particles having a generally spherical shape bound together by an organic binder and to a process for producing a BN powder composition of spherically shaped boron nitride agglomerated particles having a treated surface layer which controls its viscosity.

19 Claims, 4 Drawing Sheets

(56) References Cited

U.S. PATENT DOCUMENTS

| | | |
|---|---|---|
| 2003/0222249 A1 | 12/2003 | Bunyan et al. |
| 2004/0000712 A1 | 1/2004 | Wilson et al. |
| 2004/0007764 A1 | 1/2004 | Jang |
| 2004/0009353 A1 | 1/2004 | Knowles et al. |
| 2004/0077764 A1 | 4/2004 | Lodyga et al. |
| 2004/0118551 A1 | 6/2004 | Czubarow et al. |
| 2004/0220419 A1 | 11/2004 | Gottschalk-Gaudig et al. |
| 2005/0041373 A1 | 2/2005 | Prusse et al. |
| 2005/0153124 A1 | 7/2005 | Finn et al. |
| 2006/0121068 A1 | 6/2006 | Sane et al. |
| 2006/0127422 A1 | 6/2006 | Lodyga et al. |
| 2007/0041918 A1 | 2/2007 | Meneghetti et al. |
| 2007/0054122 A1 | 3/2007 | Paisner et al. |
| 2012/0058342 A1* | 3/2012 | Lodyga et al. ............... 428/403 |

FOREIGN PATENT DOCUMENTS

| | | |
|---|---|---|
| EP | 0424094 A | 4/1991 |
| EP | 0 696 630 | 2/1996 |
| EP | 1 143 511 | 10/2001 |
| EP | 1 197 972 | 4/2002 |
| EP | 1 414 063 | 4/2004 |
| JP | 05-051557 | 3/1993 |
| JP | 05051540 | 3/1993 |
| JP | 06-219714 | 8/1994 |
| JP | 59-133360 | 8/1995 |
| JP | 07215705 | 8/1995 |
| JP | 08-052713 | 2/1996 |
| JP | 08-127793 | 5/1996 |
| JP | 9012771 | 1/1997 |
| JP | 10-194711 A | 7/1998 |
| JP | 10194711 A * | 7/1998 |
| WO | WO 03027207 | 4/2003 |

OTHER PUBLICATIONS

Office Action for U.S. Appl. No. 11/207,865, dated Oct. 9, 2009.
Office Action for U.S. Appl. No. 09/386,883, dated Jul. 3, 2000.
Office Action for U.S. Appl. No. 09/754,154, dated Mar. 22, 2002.
Office Action for U.S. Appl. No. 11/207,865, dated Oct. 2, 2007.
Office Action for U.S. Appl. No. 11/207,865, dated Jul. 10, 2008.
Office Action for U.S. Appl. No. 11/207,865, dated Mar. 10, 2009.
Sodium Silicate Based Thermal Interface Material for High Thermal Contact Conductance, Transactions of ASME, vol. 122, Jun. 2000, pp. 128-131.
Hagio et al., Sintering of the Mechanochemically Activated Powders of Hexagonal Boron Nitride, Communications of the American Ceramics Society, vol. 72, No. 8, pp. 1482-1484.
Lin Li and D.D.L. Chung, Electrical and mechanical properties of electrically conductive polyethersulfone composites, Sep. 30, 1991, pp. 215-224, vol. 25, Butterworth-Heinemann Ltd.
Newton, David E., Chemistry of New Materials, 2007, p. 31, Facts on File, Inc., New York, NY.
Office Action for U.S. Appl. No. 11/327,770, dated Nov. 3, 2009.
Office Action for U.S. Appl. No. 11/327,770, dated May 27, 2010.
Office Action for U.S. Appl. No. 11/327,770, dated Dec. 10, 2010.

* cited by examiner

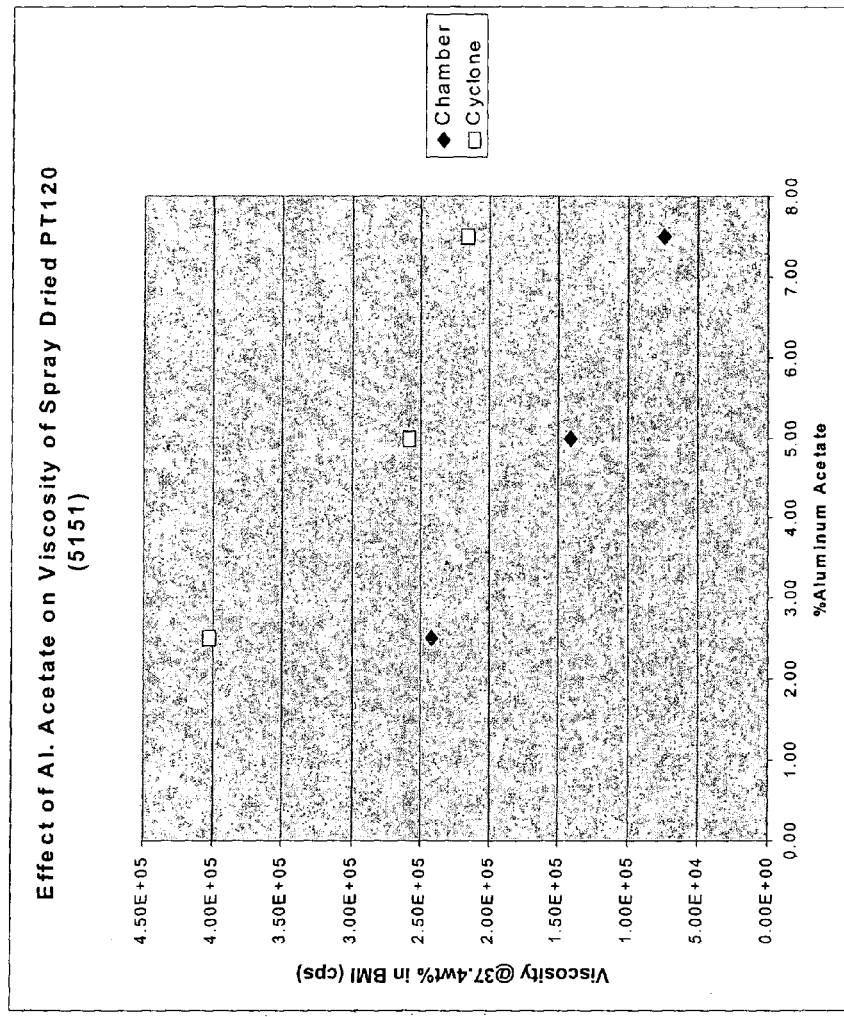
FIG. 4 PolarSphere: Effect on Viscosity

LOW VISCOSITY FILLER COMPOSITION OF BORON NITRIDE PARTICLES OF SPHERICAL GEOMETRY AND PROCESS

CROSS-REFERENCE TO RELATED APPLICATIONS

This application is a continuation of U.S. patent application Ser. No. 09/754,154, filed Jan. 3, 2001, now U.S. Pat. No. 6,713,088, issued Mar. 30, 2004.

FIELD OF INVENTION

This application is a continuation-in-part of U.S. patent application Ser. No. 09/386,883 filed Aug. 31, 1999 and relates to a low viscosity filler composed of boron nitride agglomerated particles of spherical geometry, a process for forming a low viscosity filler of boron nitride agglomerated particles of spherical geometry and to a low viscosity boron nitride filled composition composed of a polymer selected from the group consisting of a polyester, epoxy or polyamide loaded with a low viscosity filler composition of BN particles in a concentration of between 30-50 wt. % BN with the composition having a viscosity below about 300 cp and preferably below about 250 cp.

BACKGROUND OF THE INVENTION

Boron nitride (EN) is a chemically inert non-oxide ceramic material which has a multiplicity of uses based upon its electrical insulating property, corrosion resistance, high thermal conductivity and lubricity, A preferred use is as a filler material additive to a polymeric compound for use in semiconductor manufacture as an encapsulating material or to form a low viscosity thermosetting adhesive or in formulating a cosmetic material. As presently manufactured boron nitride is formed by a high temperature reaction between inorganic raw materials into a white powder composition of BN particles having an hexagonal structure similar to graphite in a platelet morphology. The platelet morphology is for many applications undesirable and of limited utility. A conventional powder composition of BN particles has the physical attributes of flour in terms of its inability to flow. Accordingly, when added as a filler to a polymer a blended material is formed having poor rheological properties and at loaded concentrations above 30 wt. % BN the blended material is so viscous that it is difficult to dispense from a mechanical dispenser such as a syringe. The physical characteristics of the filled polymer are enhanced at loading concentrations above 30 wt. % BN. Accordingly, a powder composition of BN particles with an improved rheology for use as a filler at high loading concentrations would be desirable.

The surface morphology and shape of conventional platelet BN particles are modified in accordance with the present invention to form boron nitride agglomerated particles bound by an organic binder such that when filled into a polymeric compound at loading levels between 30 to 50 wt. % BN the viscosity of the filled composition remains below 300 cp and preferably below a viscosity of 250 cp.

SUMMARY OF THE INVENTION

In accordance with the present invention, a low viscosity composition of spherically shaped agglomerated particles of boron nitride can be formed by spray drying an aqueous slurry composed of boron nitride particles of random irregular shape in combination with an organic binder and a base adapted to maintain the pH of the slurry above about 7.3 and optimally above a pit of 7.5, at a sustained elevated temperature into a dry powder composition of spherically shaped RN agglomerated particles with the concentration of the organic binder in the slurry adjusted to at least above about 1.8 wt. % of the slurry to form a residue of organic binder and/or a decomposition layer from said organic binder on said particles for modifying the surface viscosity of the composition without degrading the physical properties attributable to boron nitrate such as high thermal conductivity.

Each BN particle in the composition of the present invention represents a composite agglomerate of non-spherical BN particles bound together by an organic binder in a generally spherical geometry. The diameter of each spherically shaped BN particle formed by the spray drying method of the present invention may vary in size over a relatively wide size distribution of sizes but may be controlled so that the majority of particles and up to about 98% of the BN particles have a minimum diameter above one micron and preferably a minimum diameter above about 5 microns. The size distribution of the BN particles may extend to a maximum diameter of about 275 microns. Although the size distribution is relatively wide the BN particles have an average size which falls into a much narrower size range between about 10 microns and 150 microns in diameter and can be adjusted to form an even narrower size range by adjustment of the physical parameters of the spray drying operation and/or the initial size of the non-spherical particles of BN in the slurry. Accordingly, the size of the spherical BN agglomerated particles formed in the spray drying process of the present invention can be controllably varied over of a preferred range of from as low as 1 micron in diameter to a preferred maximum diameter of about 75 microns so as to accommodate a variety of end uses.

The spherical shape of the BN particles formed in accordance with the present invention and the weight concentration of organic binder in the slurry controls the degree to which the particles flow and, in turn, the viscosity of the polymeric compound into which the particles are loaded. The ability to "flow" is an essential characteristic of the spray dried BN material when used as a low viscosity filler. The degree to which a material can "flow" is readily measurable as is well known to those skilled in the art. In contrast, a powder composition of conventional non-spherical BN is unable to flow and inhibits the flow characteristic of the filled polymer. The standard used in the present invention to establish the existence or non-existence of a flowable material is the ASTM B213-77 hall flow standard as is well known to those skilled in the art. In the present invention, it is essential to be able to load the BN spray dried particles into a polymeric compound at loading levels of above at least 30 wt. % BN and preferably between about 35 to 50 wt. % BN without increasing the viscosity of the blend above about 250 cp. The BN particles can be loaded into any polymer selected from the group consisting of a polyester, a polymide or an epoxy.

A low viscosity BN filled composition is formed in accordance with the method of the present invention comprising the steps of, forming an aqueous slurry composed of irregular non-spherically shaped BN particles, water, an organic binder and a base for maintaining the pH of the slurry at a pH above 7.3, adjusting the concentration of organic binder to a minimum level above about 1.8 wt. % of the slurry and preferably above about 2 wt. %; spray drying the aqueous slurry into a powder consisting of agglomerated BN particles of generally spherical shape and adding the powder as a filer into a polymeric compound at a loading level of between 30 to 50 wt. % BN.

BRIEF DESCRIPTION OF THE DRAWINGS

Other objects and advantages of the present invention will become apparent from the following description of the preferred embodiment when read in conjunction with the accompanying drawings:

FIG. 4 is a graph showing the relationship of viscosity at a given loading of spray dried BN filler particles in an organic binder relative to the weight percent of binder in the slurry forming the spray dried BN particles.

DESCRIPTION OF THE PREFERRED EMBODIMENTS

Figure 1:
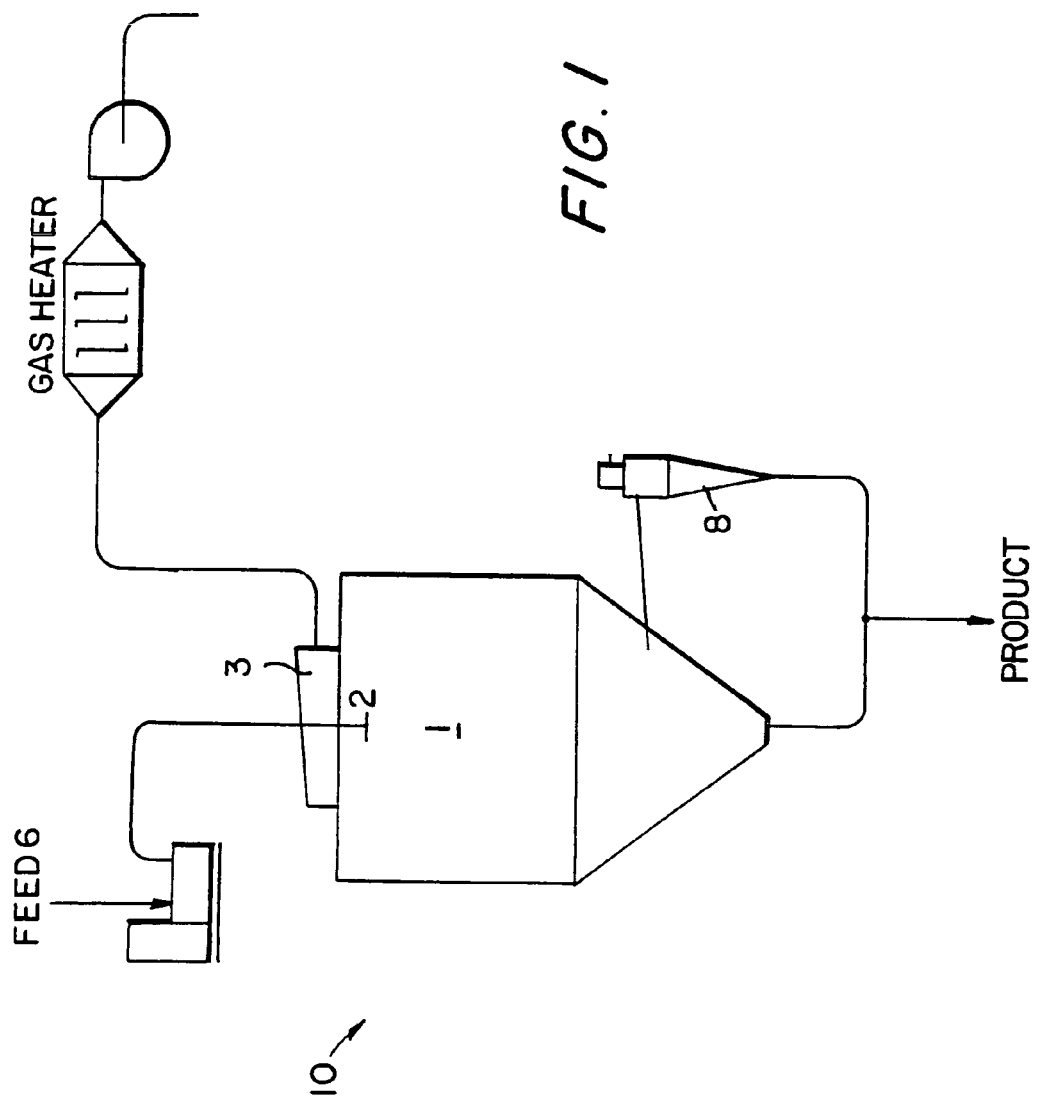
FIG. 1 is a block diagram of a conventional spray drying apparatus for producing the agglomerated spherically shaped BN particles in accordance with the present invention.

FIG. 1 is a schematic block diagram of the spray drying apparatus used in the method of the present invention to form a powder composition of BN composite particles each of generally spherical shape. The spray drying apparatus 10 may consist of conventional equipment including an atomizer 2 and a source of air or an inert gas 3, such as nitrogen, which forms an atomized spray of particles from an aqueous feed slurry 6 of water, a polymeric binder in the liquid phase and a base selected to maintain the pH of the slurry above a pH of 7.3 and preferably above a pH of 7.5. The atomized particle spray is preheated to a temperature in a range of 25° C.-360° C. preferably by preheating the nitrogen or air before injection at a desired feed rate into a spray drying chamber 1 with the outlet temperature between 110° C.-250° C. The BN particles in the feed slurry 6 preferably have a hexagonal crystalline structure although they may have a turbostratic structure. A dispersant, cross-linking agent and defoamer may also be included in the aqueous feed slurry 6 but are not essential. A polymerization initiator such as ammonium, sodium or potassium persulfate or other peroxide compound or other known polymerization initiator can be included to complete polymerization of the binder.

Figure 3:
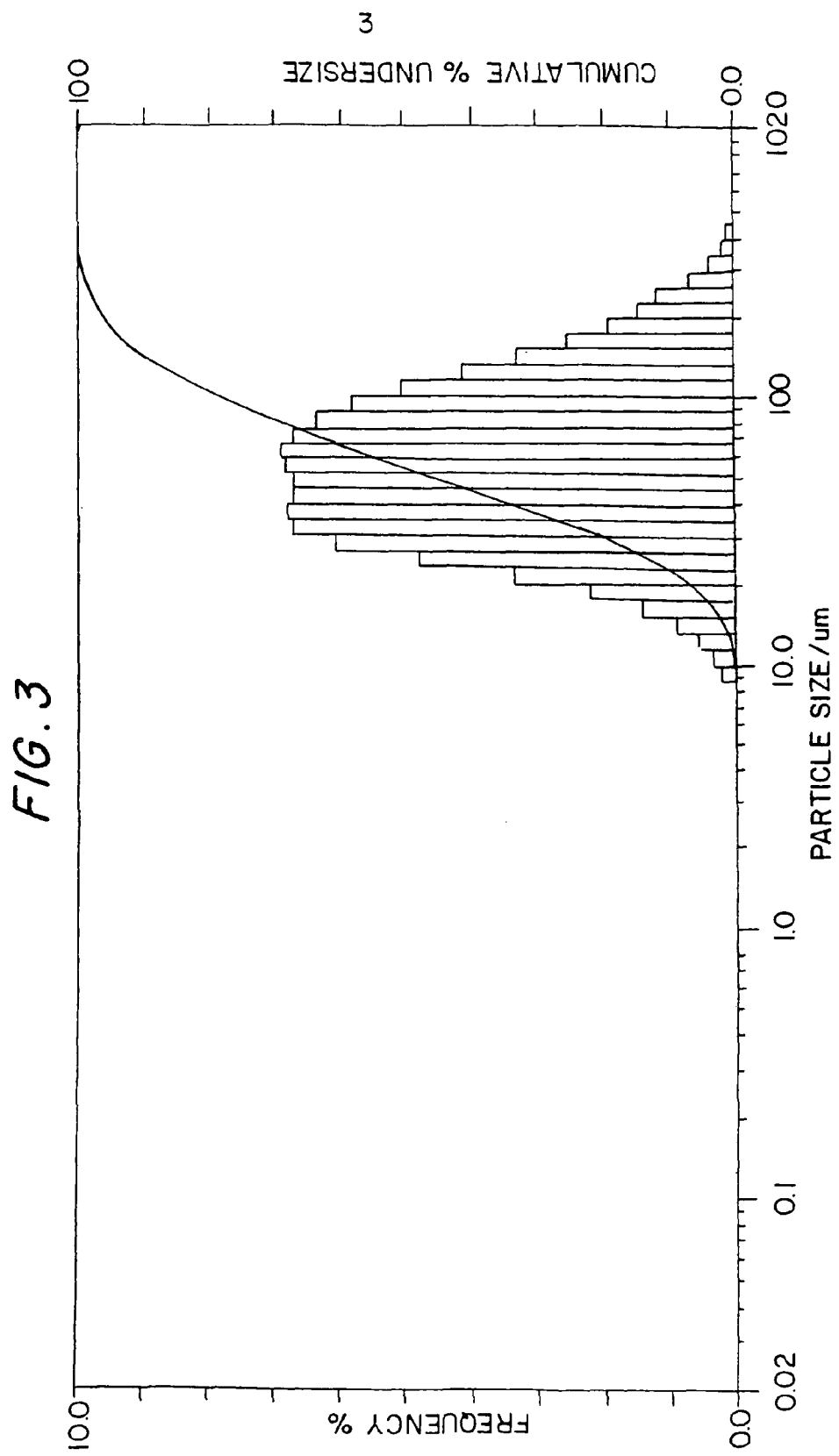
FIG. 3 is a typical graph of the particle size distribution of the collected BN particles from the spray drying operation of the present invention.

The particles formed in the spray drying chamber 1 are dried at an elevated temperature to a moisture level typically below 1% and collected. A cyclone 8 may be incorporated to remove superfine size particles before collection. The collected particles are solid particles having the same structure as the initial BN particles in the slurry 1 and will vary in diameter over a distribution range as shown in FIG. 3 from a minimum diameter size of one about micron up to about 275 microns with a mean particle size which varies based upon the size of the non-spherical BN particles, the concentration of binder, and the selected spray drying parameters of operation such as slurry ratio, feed rate, gas pressure etc. The mean particle size for the distribution of particles in FIG. 3 is about 55 microns but can be controllably adjusted.

Figure 2:
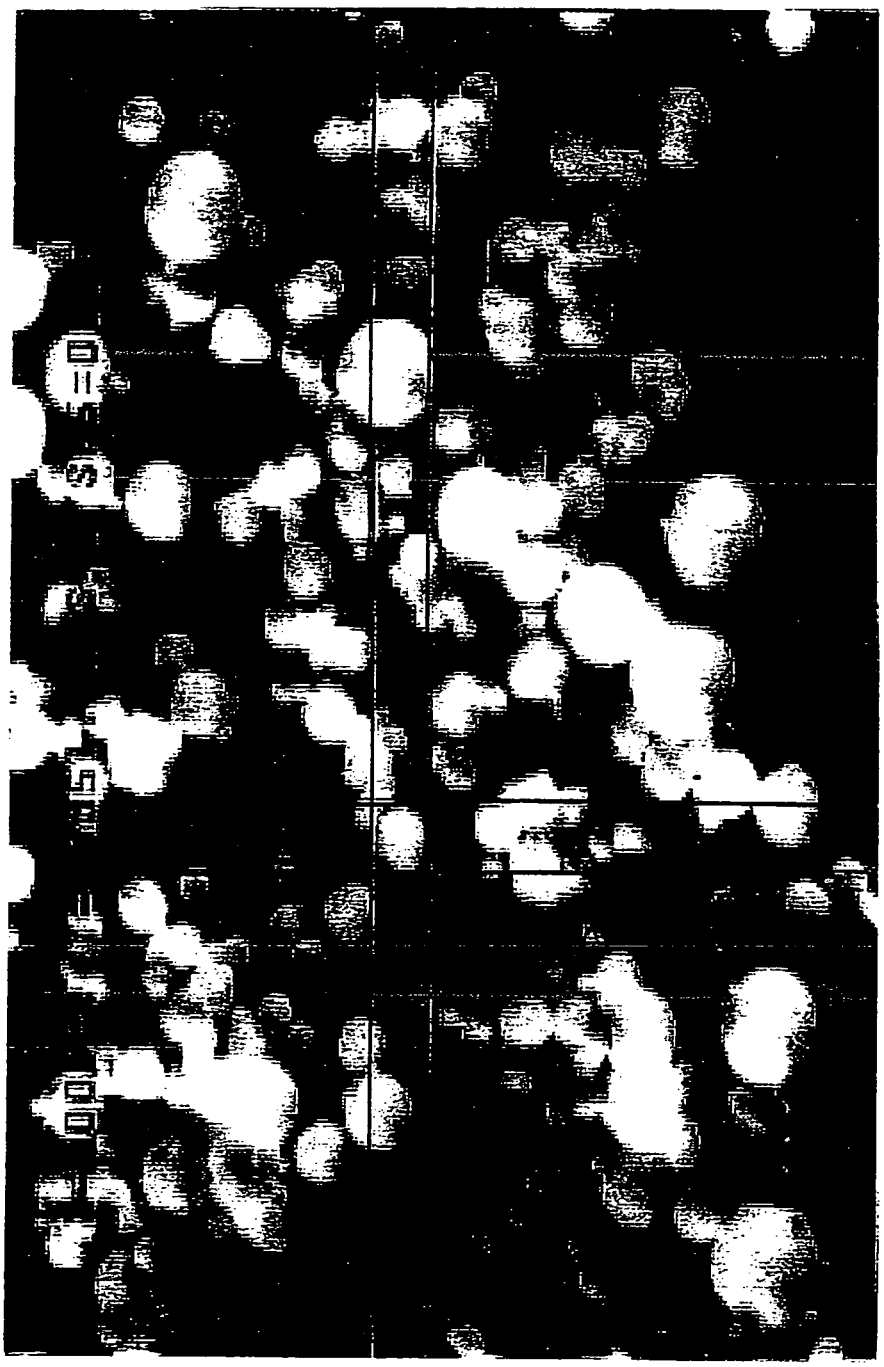
FIG. 2 is a photomicrograph of the spherically shaped BN particles formed by the spray drying operation of the present invention at a magnification of 50×.

In accordance with the present invention the powder BN product collected from the spray drying operation possesses particles which are essentially all of generally spherical geometry as evident from the photomicrograph of FIGS. 2 and 3. Each of the collected particles is a solid agglomerated particle formed of irregular non-spherical BN particles bound together by the organic binder in a spherical geometry. The high concentration of the organic binder in the slurry forms a coating over each of the recovered particles which at a concentration of over about 1.8 wt. % of the slurry varies the surface characteristic of the spray dried BN particles such that when added as a filler to a polymer selected from a polyester, epoxy or polyimide even under high loading levels at concentrations of between 30-50 wt. % BN, the flow characteristic of the filled polymer is not inhibited. In fact the viscosity of the filled polymer can be tailored to below about 250 cp. provided the concentration of organic binder is above about 2 wt. % of the slurry and optimally at about 2.5 wt. %. At a viscosity below about 250 cp. the filler polymer is easily dispensed through any conventional mechanical dispenser.

The organic binder is needed to bond the BN particles during spray drying and to modify its viscosity characteristic. The latter requirement limits the choice of organic binder to a water soluble acrylic or acetate which at high concentration has been found to function as a viscosity modifier. A preferably acrylic binder is formed from monoethylenically unsaturated acid free monomers comprising $C_1$-$C_4$ alkyl esters of acrylic or methacrylic acids such as methly acrylate, ethyl acrylate, butyl acrylate, methyl methacrylate, ethyl methacrylate, butyl methacrylate and isobutyl methacrylate; hydroxyalkyl esters of acrylic methacrylic acids such as hydroxyethyl acrylate, hydroxypropyl acrylate, hydroxyethyl methacrylate and hydroxypropyl methacrylate; acrylamides and alkyl-substituted acrylamides including acrylamide, methacrylamide, N-tertiarybutylacrylamide, N-methacrylamide and N,N-dimethacrylamide, dimethylaminoethyl acrylate, dimethylaminoethyl methacrylate; acrylonitrile and methacrylonitrile. The monoethylenically unsaturated acid free monomer may include the acrylic monomer styrene so as to form a copolymer or may be formed solely from styrene. Preferred examples of acid free monomers include butyl acrylate, methyl methacrylate, ethyl methacrylate, butyl methacrylate, hydroxyethyl acrylate, hydroxyethyl methacrylate, acrylamide, methacrylamide, N-tertiarybutylacrylamide and styrene as a copolymerization agent. Acid containing monomers are less desirable but may equally be used. Such acid containing monomer may be selected from any carboxylic acid monomer preferably acrylic acid and methacrylic acid.

Although any acetate may be used for the organic binder a metal acetate is preferred over a non-metal acetate. The preferred metal acetates include nickel acetate, aluminum acetate, titanium acetate and any transition metal oxide acetate such as zinc acetate. Ammonium acetate is less desirable but is an acceptable non-metal acetate. The elevated drying temperatures used in the spray drying operation may cause the acetate to partially or entirely decompose to an hydroxide film on the surface of the BN agglomerated particles. The concentration of binder and any hydroxide decomposition layer formed on the agglomerated BN particles following spray drying should remain essentially at the same molar ratio as the corresponding weight ratio of binder to boron nitride in the slurry. Accordingly, for a concentration of at least 1.8 wt. % of binder in the slurry, the molar ratio of binder to boron nitride should be in a range of 0.00170-0.008 particularly for metal acetate binders.

The base can be selected from any suitable alkaline which will enable the pH of the slurry to be controllably maintained above a pH of 7 and preferably above 7.3. A preferred base is an hydroxide such as ammonium hydroxide or an alkali metal hydroxide such as sodium hydroxide or potassium hydroxide or a methyl or ethyl ammonium hydroxide.

The following are examples of four ceramic slurries spray dried in accordance with the present invention to substantiate the production of spherical BN particles from a feed slurry of non-spherical irregular shaped BN particles. The four slurries consisted of conventional non-spherical BN powder in water with feed solids ranging from 32% to 49%. The pH of each slurry sample varied between 7.75 and 8.5. The pH was controlled by the addition of an ammonium hydroxide buffer at a concentration of less than 0.5 wt %. The binder selected for each example was "Efla" 4550 in a concentration of between about 1 to 5 wt %. "Efka" is a registered trademark of the Lubrizol Corporation and is a polyacrylate. A resin dispersant Efka 1501 which is a polyester fatty acid from Lubrizol at a concentration of about 0.25-2.00% was also added. Alternate binders which were found to be just as effective include "DURAMAX" 1022, "DURAMAX" 1020 and "DURAMAX"3007. "DURAMAX" is a registered trademark of the Rohm and Haas Company in Philadelphia Pa. "DURAMAX" 1020 and "DURAMAX" 1022 are styrene/acrylic copolymers formed from acrylic monomers. It was not necessary to add any resin dispersant. However, a buffer such as ammonium hydroxide used to adjust the pH of the non-spherical BN particle aqueous slurry to above 7.3 was essential.

The following four tables contain all of the process conditions of the spray drying operation:

TABLE I

BN SLURRY FEED PROPERTIES

| Feed Number | 1 | 2 | 3 | 4 |
|---|---|---|---|---|
| Feed Material | Boron nitride (BN) shiny in Water | | | |
| Percent EFKA binder | 0.25-4.0 | | | |
| Run Number | 1 | 2 | 3 | 4 |
| Solids, %* | 32.7-49.0 | | | |
| Temperature, °C. | 19 | 23 | 19 | 19 |
| Density, g/cm$^3$ | 1.292 | 1.195 | 1.194 | 0.963 |
| pH | 7.75 | 8.44 | 8.38 | 7.77 |
| Viscosity, Avg. CP | 104 | 706 | 806 | 3006 |

TABLE 2

BN TEST DATA PROPERTIES

| PRODUCT: Run no | 1 | 2 | |
|---|---|---|---|
| Sample location | Chamber | Chamber | Cyclone |
| Sample time | 10:40 | 11:10 | 12:15 |
| Sample weight, g | 195.8 | 210.3 | 199.5 |
| Total weight, kg | 0.59 | 7.17 | 9.48 |
| Total residual moisture, %$_2$ | 0.30 | 0.50 | 0.35 |
| Bulk density, g/cc | 0.551 | 0.562 | 0.521 |
| Tapped density, g/cc | 0.621 | 0.631 | 0.611 |
| Particle size, microns, | | | |
| 10% less than | 27.02 | 30.09 | 11.00 |
| 50% less than (median size) | 94.07 | 112.13 | 23.31 |
| 90% less than | 189.84 | 180.28 | 87.87 |
| Chamber-to-cyclone ratio (kg/kg) | | 0.82 | |

TABLE 3

BN TEST DATE PROPERTIES

| PRODUCT: Run no. | 2B | |
|---|---|---|
| Sample location | Chamber | Cyclone |
| Sample weight, g | 132.6 | 74.9 |
| Total weight, kg | 5.26 | 5.33 |
| Total residual moisture, % | 0.45 | 0.79 |
| Bulk density, g/cc | | |
| Particle size, microns | | |
| 10% less than | 23.49 | 15.09 |
| 50% less than (median size) | 55.03 | 25.42 |
| 90% less than | 142.60 | 43.90 |
| Chamber-to-cyclone ration (Kg/Kg) | 2.15 | 0.99 |

TABLE 4

BN TEST DATA PROPERTIES

| Run no. | 3 | | 4 | |
|---|---|---|---|---|
| Sample location | Chamber | Cyclone | Chamber | Cyclone |
| Sample weight, g | 141.6 | 85.2 | 110.5 | NA |
| Total weight, kg | 3.04 | 6.24 | 1.13 | 1.50 |
| Total residual moisture, % | 0.59 | 0.43 | 0.41 | 0.39 |
| Bulk density, g/cc | 0.331 | 0.221 | 0.305 | 0.273 |
| Tapped density, g/cc | 0.409 | 0.287 | 0.382 | 0.342 |
| Particle size, microns | | | | |
| 10% less than | 10.83 | 8.46 | 7.22 | 6.91 |
| 50% less than (median size) | 25.85 | 14.59 | 14.69 | 12.87 |
| 90% less than | 102.38 | 21.66 | 25.89 | 20.37 |
| Chamber-to-cyclone ration (kg/kg) | 0.49 | | 0.75 | |

The following is another example for forming spray dried boron nitride particles in accordance with the present invention. In this example aluminum acetate is used as the organic binder and bismaliamide is used as the polymer.

A boron nitride powder PT120 (Lot 5151) was used to demonstrate the effect of surface modification on the viscosity of the BN filled resin. A conventional thermosetting resin, bismaliamide (BMI), from Quantum Chemical was used as the polymer into which non-spherical BN particles were loaded. PT 120 is a conventional boron nitride powder with a platelet morphology. The physical and chemical characteristics are shown in the following Tables 5A-5C.

The PT120 filled resin was spray dried using a laboratory scale spray dryer, Mobile Minor Hi Tec, made by Niro Atomizer.

A slurry was prepared by mixing boron nitrate in de-ionized water using a high intensity mixer. Aluminum acetate-dibasic was added to the slurry and the slurry was mixed. After stabilizing the slurry, spray dying was initiated. The slurry composition for three separate runs is described in Table 5A.

TABLE 5A

| Run No. | 5D7 | SD8 | SD9 |
|---|---|---|---|
| Water (gm) | 3000 | 3500 | 3000 |
| Boron Nitride (gm) | 1050 | 1225 | 1050 |
| Aluminum Acetate-Dibasic (gm) | 52 | 91.88 | 26.25 |
| BN/Water (wt. %) | 35 | 35 | 35 |
| Al. Acet./BN (wt. %) | 5 | 7.5 | 2.5 |

After the slurry was prepared, it was kept agitated by the mixer. The slurry was then pumped into the feed section of the spray dryer by using a peristalic pump. The spray dryer was operated with its fan on, inlet temperature in the range of 250° C.-270° C. The outlet temperature was in the range of 110° C. to 150° C. Air flow was set in the range of 17 to 22 on the gauge. Boron nitride feed rate (powder basis) was 1016, 1050 and 841 gm/hr for SD7, SD8 and SD9 respectively. Powders were collected from chamber and cyclone and then tested for their rheological properties.

Rheological Testing:

Powders were mixed with the BMI resin alone at 37.4 wt. % loading level to form a baseline. About 30 gm. of resin was used in each case. After careful mixing in a cup, it was placed in a vacuum chamber for removal of trapped air. After evacuating for a few hours, it was carefully mixed and then placed into evacuation chamber again. Once air bubbles stopped rising to the surface, the cup was removed. The resultant paste was gently stirred and placed in a water-cooled bath for equilibrating to 25° C. After it reached a constant temperature of 25° C., viscosity was measured by Brookfield rheometer DVII using spindle no. 96. Viscosity was measured at various speeds but the measurements taken at 5 rpm ware used for comparison. Measurements were taken after at least 5 minutes from the start of the rotation to obtain steady state value.

The results of viscosity tests and analytical data are given in Table 5B and 5C for powders collected from chamber and cyclone respectively.

TABLE 5B

|  | PT120 - Baseline | SD7 - Chamber | SD8 - Chamber | SD9 - Chamber |
|---|---|---|---|---|
| % Oxygen | 0.371 | 5.17 | 5.71 |  |
| % Carbon | 0.021 | 0.58 | 0.84 |  |
| Surface Area | 2.97 | 4.5 | 7.91 | 8.68 |
| MicroTrac Size |  |  |  |  |
| D-10 (Microns) | 6.15 |  |  |  |
| D-50 (Microns) | 12.32 |  |  |  |
| D-90 (Microns) | 21.71 |  |  |  |
| Shape | Plate | Spheroidal | Spheroidal | Spheroidal |
| Agglomerage Size microns |  | 70-150 | 70-150 | 70-150 |
| Viscosity @5 RPM (cps) | 400,000 | 141,000 | 74,000 | 242,000 |
| Comments | No aluminum acetate - no sphericalization | Increased surface area due to coating | Increased surface area due to coating | Increased surface area due to coating |

TABLE 5C

|  | PT120 - Baseline | SD7 - Chamber | SD8 - Chamber | SD9 - Chamber |
|---|---|---|---|---|
| Agglomerage Size (microns) |  | 10-50 | 10-50 | 10-50 |
| Viscosity @5 RPM (cps) | 400,000 | 258,000 | 216,000 | 402,000 |

What we claim is:

1. A composition consisting essentially of:
   spherical agglomerated boron nitride particles comprising irregular shaped boron nitride particles bound together by an organic binder in a generally spherical geometry, the spherical agglomerated particles having an average diameter of about 10 microns or greater, a tap density of from about 0.287 to about 0.631 g/cc, and a surface layer of the organic binder and/or decomposition product thereof.

2. A composition as defined in claim 1, wherein said organic binder is selected from the group consisting of an acrylic and an acetate.

3. A composition as defined in claim 1, wherein the molar ratio of said organic binder to said boron nitride is about 0.00170-0.008.

4. A composition as defined in claim 1, wherein the concentration of said organic binder in said slurry is about 1.8 wt. % or greater.

5. A composition as defined in claim 1, wherein said organic binder is selected from the group consisting of nickel acetate, aluminum acetate and titanium acetate and monoethylenically unsaturated acid free monomers, consisting of $C_1$-$C_4$ alkyl esters of acrylic or methacrylic acids, hydroxylalkyl esters of acrylic or methacrylic acids, acrylamides and alkyl-substituted acrylamides.

6. A low viscosity boron nitride filled polymer composition comprising:
   a polymer selected from the group consisting of a polyester, epoxy and polyamide; and
   spherical particles of agglomerated boron nitride having a tap density of from about 0.287 to about 0.631 g/cc loaded to a concentration of between 30 to 50 wt. % boron nitride, wherein the spherical particles of boron nitride comprise non-spherical shaped boron nitride particles bound together by an organic binder.

7. A low viscosity boron nitride filled polymer composition as defined in claim 6, wherein said binder is selected from the group consisting of an acrylic or an acetate.

8. A low viscosity boron nitride filled polymer composition as defined in claim 6, wherein said binder is selected from the group of nickel acetate, aluminum acetate and titanium acetate.

9. A low viscosity boron nitride filled polymer composition as defined in claim 8, wherein the concentration of metal acetate in said slurry is about 1.8 wt. % or greater.

10. A process for forming a boron nitride powder comprising agglomerated particles of spherical geometry having an average particle size of about 10 to 150 microns in diameter and a tap density of from about 0.287 to about 0.631 g/cc, said process comprising the steps of:
    mixing an aqueous slurry including irregular shaped particles consisting essentially of boron nitride, water, and an organic binder; and spray drying the aqueous slurry into a powder composition of agglomerated boron nitride particles.

11. The process of claim 10, wherein said organic binder is selected from the group consisting of consisting of acrylics and acetates.

12. A process for forming a boron nitride powder comprising agglomerated particles of spherical geometry having an average particle size of about 10 to 150 microns in diameter and a tap density of from about 0.287 to about 0.631 g/cc, said process comprising the steps of:

mixing an aqueous slurry including irregular shaped particles consisting essentially of boron nitride, water, and a binder selected from the group consisting of nickel acetate, aluminum acetate and titanium acetate; and spray drying the aqueous slurry into a powder composition of agglomerated boron nitride particles.

13. A powder comprising substantially spherical agglomerated particles consisting essentially of a composite of non-spherical boron nitride particles bound together by an organic binder, wherein said spherical agglomerated particles have an average particle size of about 10 to 150 microns in diameter and a tap density of from about 0.287 to about 0.631 g/cc.

14. The boron nitride powder of claim 13, wherein said particles have a surface layer comprising an organic binder and/or decomposition product thereof.

15. The boron nitride powder of claim 14, wherein said decomposition product comprises a hydroxide.

16. The boron nitride powder of claim 13, wherein said spherical agglomerates particles are prepared by spray drying an aqueous slurry of non-spherical shaped boron nitride particles, water, and an organic binder.

17. The boron nitride powder of claim 16, wherein said aqueous slurry further comprises a base for maintaining the pH of the slurry basic.

18. The boron nitride powder of claim 17, wherein said organic binder is at a level of about 1.8 wt. % or greater of said aqueous slurry.

19. A polymer composition comprising the boron nitride powder of claim 13.

* * * * *